United States Patent
Kwon et al.

(10) Patent No.: US 8,606,043 B2
(45) Date of Patent: Dec. 10, 2013

(54) METHOD AND APPARATUS FOR GENERATING 3D IMAGE DATA

(75) Inventors: Oh-jae Kwon, Hwaseong-si (KR); Jong-sul Min, Suwon-si (KR); Jae-moon Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 12/974,384

(22) Filed: Dec. 21, 2010

(65) Prior Publication Data

US 2011/0158506 A1    Jun. 30, 2011

(30) Foreign Application Priority Data

Dec. 30, 2009   (KR) ................. 10-2009-0134925

(51) Int. Cl.
*G06K 9/36* (2006.01)
(52) U.S. Cl.
USPC .............................. 382/285; 382/154; 345/419
(58) Field of Classification Search
None
See application file for complete search history.

(56) References Cited

U.S. PATENT DOCUMENTS

| | | | |
|---|---|---|---|
| 7,542,028 B2 * | 6/2009 | Suzuki ........................ | 345/157 |
| 7,558,320 B2 * | 7/2009 | Winder et al. ........... | 375/240.12 |
| 2007/0024614 A1 * | 2/2007 | Tam et al. ................... | 345/419 |
| 2008/0225059 A1 * | 9/2008 | Lowe et al. ................ | 345/626 |
| 2009/0052796 A1 * | 2/2009 | Furukawa et al. .......... | 382/260 |
| 2009/0196492 A1 | 8/2009 | Jung et al. | |

FOREIGN PATENT DOCUMENTS

WO    2008/112624 A2    9/2008

OTHER PUBLICATIONS

Liang Zhang and Wa James Tam, "Stereoscopic Image Generation Based on Depth Images for 3D TV", Jun. 2005, IEEE Transactions on Broadcasting, vol. 51, No. 2, pp. 191-199.*

Jannick P. Rolland; Christina A. Burbeck; William Gibson; and Don Ariely, "Towards Qualifying Depth and Size Perception in 3D Virtual Environments", 1995.*

Communication from European Patent Office issued Apr. 14, 2011, in corresponding Application No. 10196404.7.

* cited by examiner

*Primary Examiner* — Samir Ahmed
*Assistant Examiner* — Siamak Harandi
(74) *Attorney, Agent, or Firm* — Sughrue Mion, PLLC (57) ABSTRACT

A method and apparatus for generating three-dimensional (3D) image data by using 2D image data including a dummy component and an image component relating to an input image, wherein the dummy component is used to adjust a resolution of the input image, are provided. The method includes: generating a depth map that corresponds to the 2D image data; detecting a dummy area including the dummy component from the 2D image data; and correcting depth values of pixels that correspond to the dummy area in the depth map.

24 Claims, 7 Drawing Sheets

METHOD AND APPARATUS FOR
GENERATING 3D IMAGE DATA

CROSS-REFERENCE TO RELATED PATENT
APPLICATION

This application claims priority from Korean Patent Application No. 10-2009-0134925, filed on Dec. 30, 2009, in the Korean Intellectual Property Office, the disclosure of which is incorporated herein in its entirety by reference.

BACKGROUND

1. Field

Apparatuses and methods consistent with exemplary embodiments relate to a method and apparatus for generating three-dimensional (3D) image data, and more particularly, to a method and apparatus for generating 3D image data by using 2D image data in which a dummy component is added to an image component relating to an input image, wherein the dummy component is used to adjust a resolution of the input image.

2. Description of the Related Art

Three-dimensional (3D) image technology is developing rapidly due to the development of digital technology. Through 3D image technology, a more realistic image may be represented by adding information about a depth of a two-dimensional (2D) image.

People's eyes are spaced apart from each other by a distance in a horizontal direction. Thus, there is a difference between a 2D image viewed by a left eye and a 2D image viewed by a right eye, which is known as binocular disparity. The two different 2D images are combined in the brain to generate perspective and a realistic 3D image.

3D image technology includes a technology of generating video data as a 3D image and a technology of converting video data generated as a 2D image into a 3D image, and research into both technologies is being conducted.

SUMMARY

According to an aspect of an exemplary embodiment, there is provided a method of generating three-dimensional (3D) image data by using 2D image data including a dummy component and an image component relating to an input image, wherein the dummy component is used to adjust a resolution of the input image, the method including: generating a depth map that corresponds to the 2D image data; detecting a dummy area including the dummy component from the 2D image data; and correcting depth values of pixels that correspond to the dummy area in the depth map.

The method may further include generating 3D image data by moving a location of pixels in the 2D image data based on the corrected depth map.

The generating the 3D image data may include controlling the dummy component to not be located in an image area including the image component in the 3D image data.

The generating of the 3D image data may include controlling a dummy area in the 3D image data to be located at a same coordinate area as the dummy area of the 2D image data.

In the correcting the depth values, the depth values of the pixels in the dummy area may be corrected to be equal.

In the correcting the depth values, the depth values of the pixels in the dummy area may be corrected to be equal to a value representing a screen of a display device.

In the correcting the depth values, the depth values of the pixels in the dummy area may be corrected to be equal to a depth value representing an image component that is closest to a boundary of the dummy area.

The detecting the dummy area may include receiving location information about the dummy area.

The dummy component may include at least one of a pillar box and a letter box.

The method may further include: expanding or reducing the input image; and generating 2D image data by adding the dummy component to the expanded or reduced input image.

According to an aspect of another exemplary embodiment, there is provided an apparatus for generating three-dimensional (3D) image data, the apparatus including: a depth map generating unit which generates a depth map that corresponds to the 2D image data; a detecting unit which detects a dummy area including the dummy component from the 2D image data; and a correction unit which corrects depth values of pixels that correspond to the dummy area in the depth map.

According to an aspect of another exemplary embodiment, there is provided a method of generating three-dimensional (3D) image data by using two-dimensional (2D) image data comprising a dummy component and an image component relating to an input image, wherein the dummy component is used to adjust a resolution of the input image, the method including: detecting a dummy area comprising the dummy component from the 2D image data; and correcting depth values of pixels that correspond to the dummy area in a depth map that corresponds to the 2D image data.

BRIEF DESCRIPTION OF THE DRAWINGS

The above and other features and advantages will become more apparent by describing in detail exemplary embodiments thereof with reference to the attached drawings in which.

DETAILED DESCRIPTION OF EXEMPLARY
EMBODIMENTS

Hereinafter, one or more exemplary embodiments will be described more fully with reference to the accompanying drawings. Expressions such as "at least one of," when preceding a list of elements, modify the entire list of elements and do not modify the individual elements of the list.

Figure 1:
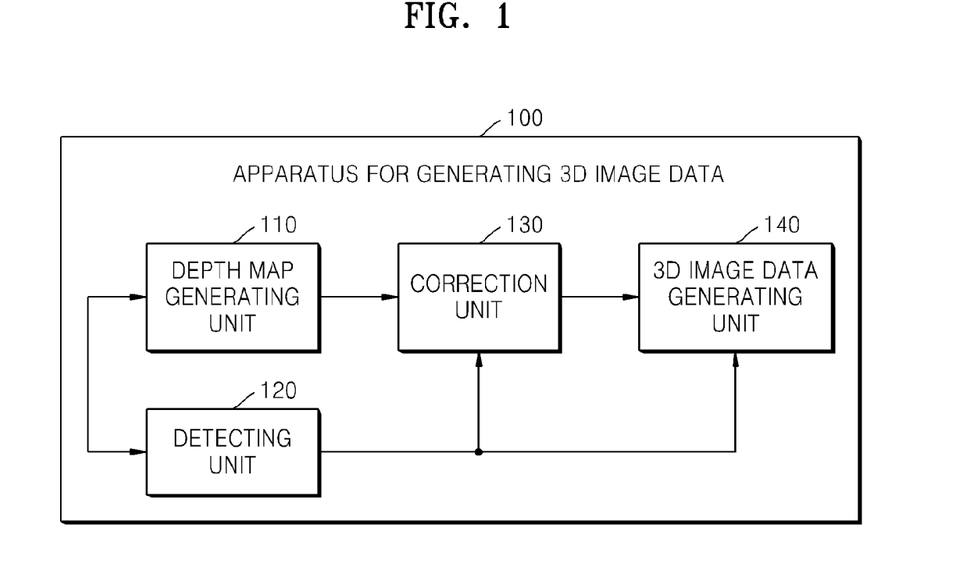
FIG. 1 is a block diagram of an apparatus for generating three-dimensional (3D) image data, according to an exemplary embodiment.

FIG. 1 is a block diagram of an apparatus 100 for generating three-dimensional (3D) image data, according to an exemplary embodiment. The apparatus 100 for generating 3D image data according to the current exemplary embodiment converts two-dimensional (2D) image data into 3D image data. The 2D image data is generated by adding a dummy component to an image component relating to an input image in order to adjust a resolution of the input image. In some cases, the resolution of the input image may not be consistent with a resolution supported by a display device, or a user may desire to change the resolution of the input image. As such, if the resolution of the input image is to be adjusted, the input image is reduced or expanded and a dummy component is added to the reduced or expanded input image, thereby generating 2D image data.

The apparatus 100 for generating 3D image data may receive from an external source or may generate 2D image data, in which a dummy component is added to an image component (for example, an input image or an expanded or reduced input image). In the latter case, the apparatus 100 for generating 3D image data may include a 2D image data generating unit (not illustrated).

The 2D image data generating unit (not illustrated) expands or reduces the input image while maintaining a horizontal/vertical resolution ratio of the input image and adds a dummy component to the expanded or reduced input image, thereby generating the 2D image data having the desired resolution. The 2D image data generating unit (not illustrated) may generally allocate the same pixel values (for example, a pixel value corresponding to black) to a dummy component in order to accurately distinguish the dummy component from the image component. For convenience of description, in the 2D image data, an area including an image component relating to an input image is called an image area and an area including a dummy component is called a dummy area.

The dummy component may include a letter box or a pillar box. The letter box indicates a dummy component located at the top and the bottom of the 2D image data and the pillar box indicates a dummy component located at the left and right sides of the 2D image data.

For example, if the input image having a resolution ratio of 4:3 is to be reproduced in a display device having a resolution of 16:9, the input image may be adjusted to the resolution image supported by the display means. If the input image is expanded/reduced by varying an expansion/reduction ratio between a horizontal component and a vertical component of the input image, an image is stretched and therefore distorted. Thus, the horizontal component and the vertical component of the input image are expanded/reduced with the same expansion/reduction ratio.

If the input image having a resolution ratio of 4:3 is expanded three times horizontally and three times vertically, an image having a resolution ratio of 12:9 is obtained. In order to reproduce the expanded input image in a display device having a resolution ratio of 16:9, a horizontal resolution may need to be adjusted. Accordingly, a dummy component is added to the left side and the right side of the expanded input image, thereby generating the 2D image data. Consequently, the expanded input image is located at the center and the 2D image data in which a pillar box is disposed at the left side and the right side of the expanded input image is generated.

As another example, if the input image having a resolution ratio of 16:9 is reproduced in a display device having a resolution ratio of 4:3, the horizontal component and the vertical component of the input image are expanded/reduced with the same expansion/reduction ratio.

If the input image having a resolution ratio of 16:9 is reduced by ¼ times horizontally and ¼ times vertically, an image having a resolution ratio of 4:2.25 may be obtained. In order to reproduce the reduced input image in a display device having a resolution ratio of 4:3, a vertical resolution may need to be adjusted. Accordingly, a dummy component is added to the top and the bottom of the reduced input image, thereby generating the 2D image data. Consequently, 2D image data in which the reduced input image is located at the center and a letter box is disposed at the top and the bottom of the reduced input image is generated.

A depth map generating unit 110 generates a depth map that corresponds to the 2D image data. The depth map includes depth values of pixels which indicate how far objects included in the 2D image data are distant from a reference point (for example, a photographing apparatus). The depth values are represented as numerical values of the degree of closeness or farness of the objects from the reference point. For example, if a depth value of a pixel indicating an object "A" is less than a value of a pixel indicating an object "B," the object "A" is located farther from (or closer to) the reference point, as compared with the object "B."

A detecting unit 120 detects a dummy area including a dummy component in the 2D image data. The detecting unit 120 may detect a dummy area by analyzing the 2D image data. The dummy component may generally have a pixel value that corresponds to a specific color such as black. For example, the detecting unit 120 may therefore determine whether the pixel value that corresponds to the specific color exists in a symmetrical form at the top and the bottom of the 2D image data or at the left side and the right side of the 2D image data, and detects the dummy area accordingly. In addition, if the pixel values that correspond to a specific color are continuously disposed beyond a critical line in the 2D image data, the detecting unit 120 determines the corresponding area as the dummy area.

In addition, the detecting unit 120 may receive location information about the dummy area and detect the dummy area accordingly. In this case, the detecting unit 120 may include a receiving unit (not illustrated) which receives the location information about the dummy area. The receiving unit (not illustrated) may receive the location information about the dummy area from the 2D image data generating unit (not illustrated) or an external server. For example, the location information about the dummy area may be included in metadata for the 2D image data.

A correction unit 130 corrects depth values of pixels that correspond to the dummy area in the generated depth map. If the depth map is generated by a general method, the depth values of the pixels included in the dummy area are affected by depth values of image components that are adjacent to the dummy area. If the depth values of the pixels included in the dummy area vary, a boundary of the dummy area may be distorted or cross-talk may occur.

Figure 2A:
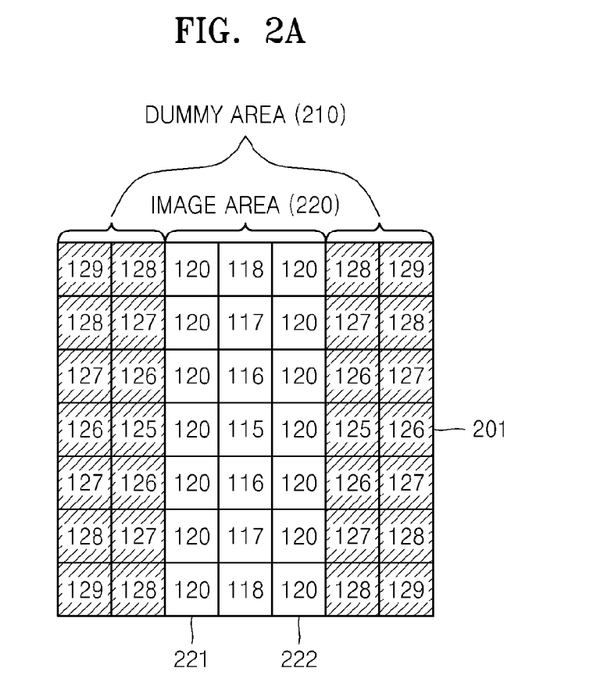
FIG. 2A is a depth map before a correction unit corrects depth values of pixels corresponding to dummy areas, according to an exemplary embodiment.

FIG. 2A illustrates a depth map before the correction unit 130 corrects the depth values of the pixels corresponding to a dummy area 210, according to an exemplary embodiment. For convenience of description, it is assumed that the depth values are in the range of 0 to 255 and 125 indicates a depth value corresponding to a screen of a display device. Also, it is assumed that if the depth value is greater than 125, an object that corresponds to the depth value is displayed as if projected from the screen, and if the depth value is less than 125, an object that corresponds to the depth value is displayed as if behind the screen.

In the depth map of FIG. 2A, the depth values of the pixels included in the dummy area 210 are different from each other. In this case, the boundary of the dummy area 210 may not be accurately recognized and thus cross-talk may occur.

Accordingly, the correction unit 130 may correct the depth values of the pixels included in the dummy area 210 to be the same values. For example, the correction unit 130 may correct the depth values of the pixels included in the dummy area 210 as depth values corresponding to a screen of a display device. As it is assumed that the depth value corresponding to a screen of a display device is 125, in the present exemplary embodiment, the correction unit 130 corrects the depth values of the pixels included in the dummy area 210 to 125.

Figure 2B:
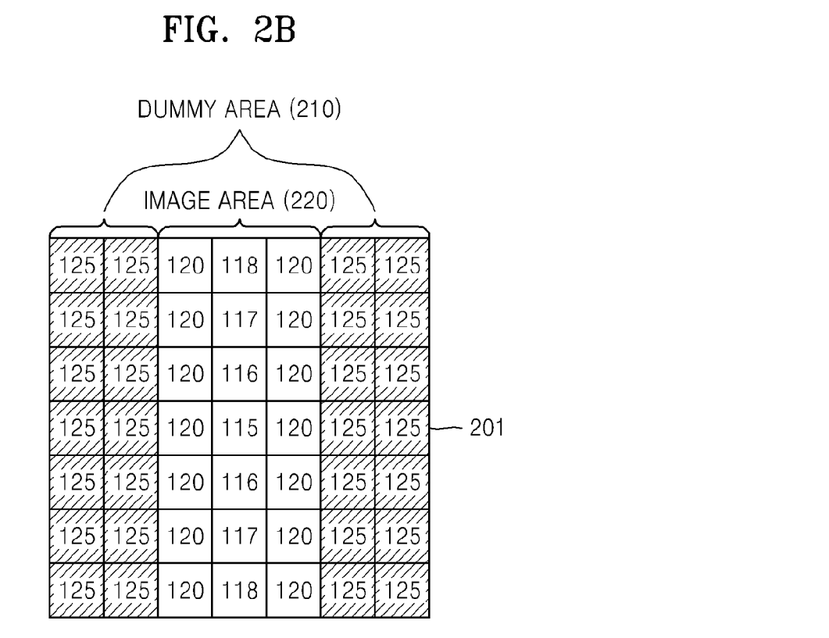
FIG. 2B is a depth map when a correction unit corrects depth values of pixels corresponding to dummy areas, according to an exemplary embodiment.

A depth map in which the depth values of the pixels included in the dummy area 210 are corrected by the correction unit 130 to the depth value corresponding to a screen of a display device according to an exemplary embodiment is illustrated in FIG. 2B. Referring to FIG. 2B, all of the depth values of the pixels included in the dummy area 210 are corrected to 125.

As another example, the correction unit 130 may correct the depth values of the pixels included in the dummy area 210 to depth values of image components that are closest to the boundary of the dummy area 210. In FIG. 2A, the depth value indicated by the image components that are closest to the boundary of the dummy area 210 is 120. Accordingly, the correction unit 130 corrects the depth values of the pixels included in the dummy area 210 to 120.

Figure 2C:
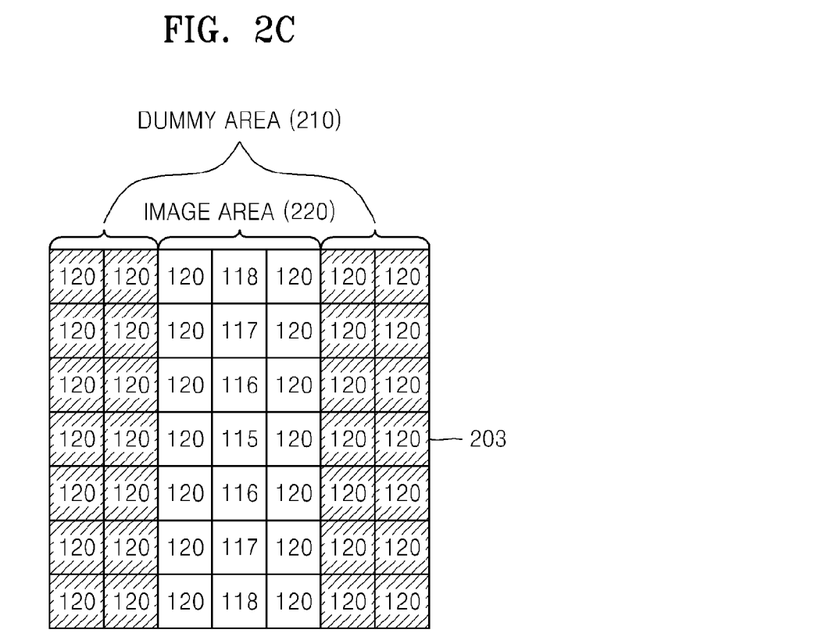
FIG. 2C is a depth map when a correction unit corrects depth values of pixels corresponding to dummy areas, according to another exemplary embodiment.

A depth map in which the depth values of the pixels included in the dummy area 210 are corrected by the correction unit 130 to the depth values of image components that are closest to the boundary of the dummy area 210 according to an exemplary embodiment is illustrated in FIG. 2C. Referring to FIG. 2C, all of the depth values of the pixels included in the dummy area 210 are corrected to '120.

As another example, if the dummy area 210 corresponds to a pillar box, the correction unit 130 corrects the depth values of the pixels included in the dummy area 210 to the depth value corresponding to a screen of a display device, and if the dummy area 210 corresponds to a letter box, the correction unit 130 corrects the depth values of the pixels included in the dummy area 210 to depth values of image components 221 and 222 that are closest to the boundary of the dummy area 210.

However, it is understood that other exemplary embodiments are not limited to the above-described correction unit 130 methods. For example, in another exemplary embodiment, if the dummy area 210 corresponds to a pillar box, the correction unit 130 corrects the depth values of the pixels included in the dummy area 210 to depth values of image components 221 and 222 that are closest to the boundary of the dummy area 210, and if the dummy area 210 corresponds to a letter box, the correction unit 130 corrects the depth values of the pixels included in the dummy area 210 to the depth value corresponding to a screen of a display device.

In addition, the correction unit 130 may correct depth values of pixels included in an image area 220. For example, the correction unit 130 may correct the depth values of pixels included in the image area 220 so that a user may feel a 3D effect more naturally. As a result, the correction unit 130 according to an exemplary embodiment may correct both the depth values of the pixels included in the image area 220 and the depth values of the pixels included in the dummy area 210, by using each different method.

A 3D image data generating unit 140 moves the location of the pixels in the 2D image data based on the corrected depth map and generates 3D image data. The 3D image data generating unit 140 calculates binocular disparity based on the depth map. A person views an object by simultaneously using his or her left eye and right eye and thus feels the 3D effect. Here, the difference in image location of the object seen by the left and right eyes is known as binocular disparity.

The 3D image data generating unit 140 generates a plurality of 3D image data in order to provide a multi-view image. In this specification, it is assumed that the apparatus 100 for generating 3D image data generates stereo-type 3D image data. In this case, the 3D image data generating unit 140 generates left-view image data exposed to the left eye and right-view image data exposed to the right eye.

For example, a specific object may be represented as if projected from a screen. In this case, the 3D image data generating unit 140 moves the object to the right in the 2D image data so as to generate the left-view image data and moves the object to the left in the 2D image data so as to generate the right-view image data. If the left-view image data is exposed to the left eye and the right-view image data is exposed to the right eye, a user recognizes that the object is projected from the screen.

Furthermore, a specific object may be represented as if located on a screen. In this case, the 3D image data generating unit 140 does not move the location of the object in the 2D image data. That is, the object is located at the same coordinate in the left-view image data and the right-view image data. If the same object is located at the same coordinate in the left-view image data and the right-view image data, a user recognizes that the object is located on the screen.

Also, a specific object may be represented as if behind a screen. In this case, the 3D image data generating unit 140 moves the object to the left in the 2D image data so as to generate the left-view image data and moves the object to the right in the 2D image data so as to generate the right-view image data. If the left-view image data is exposed to the left eye and the right-view image data is exposed to the right eye, a user recognizes that the object is behind the screen. That is, the user may recognize that the object is located far from the screen.

As described above, pixels are moved in the 2D image data and 3D image data is generated so that a dummy component may be located in the image area of the 3D image data. In this case, a boundary of the dummy area is not clear and thus cross-talk may occur.

Accordingly, the 3D image data generating unit 140 may include a controller (not illustrated). The controller (not illustrated) controls a dummy component so as to not be located in the image area including the image component. Furthermore, the controller (not illustrated) controls the dummy area in the image data to be located at the same coordinate as the dummy area in the 2D image data.

Figure 3A:
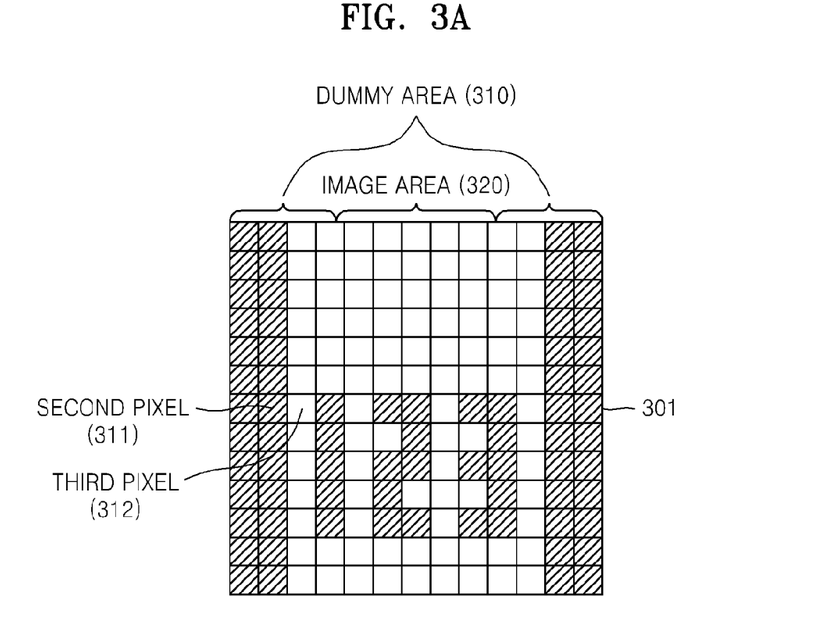
FIG. 3A illustrates 2D image data according to an exemplary embodiment.
Figure 3B:
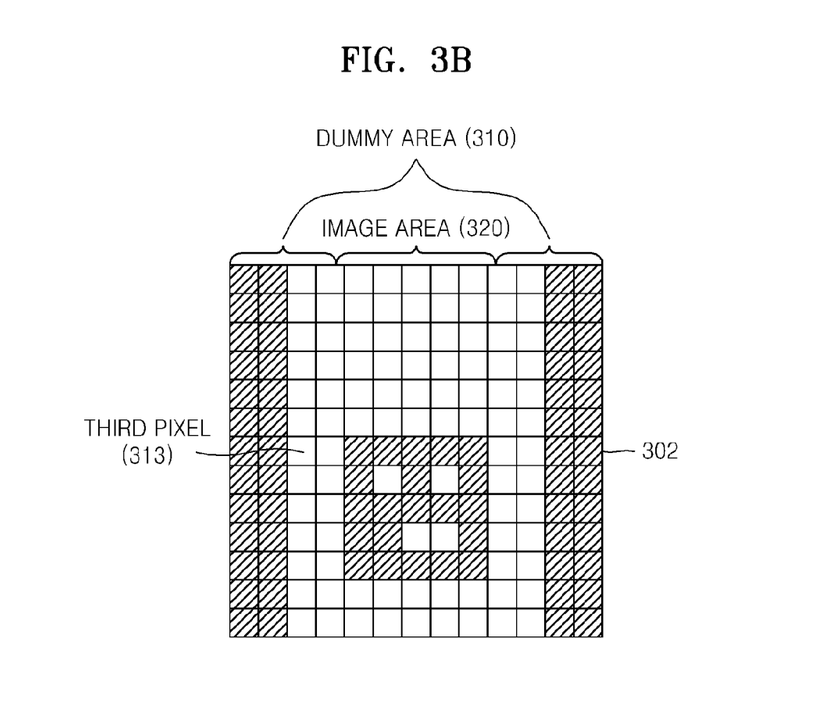
FIG. 3B illustrates image data at a left view point, according to an exemplary embodiment.
Figure 3C:
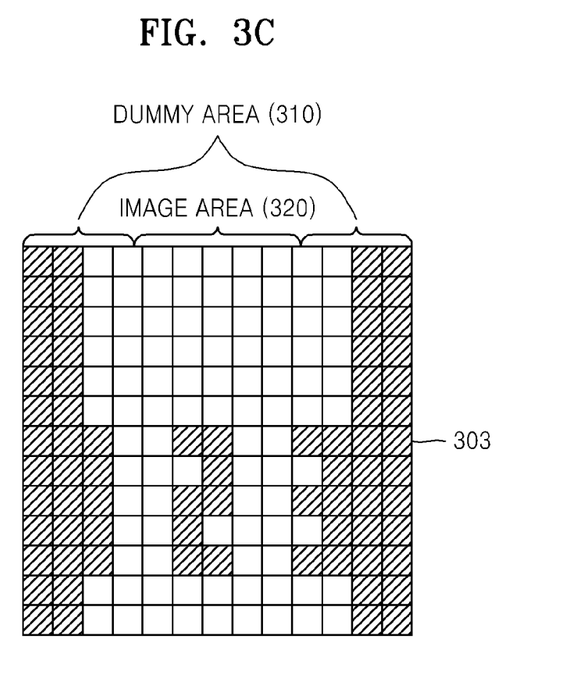
FIG. 3C illustrates image data at a right view point, according to an exemplary embodiment.

An operation of the 3D image data generating unit 140 will be described more fully with reference to FIGS. 3A through 3C. FIG. 3A illustrates 2D image data 301 according to an exemplary embodiment. The 2D image data 301 includes an image area 320 and a dummy area 310. The image area 320 includes three objects. It is assumed that object "1" is disposed to be closest to a photographing apparatus and a depth value thereof is 126, object "3" is disposed to be farthest from the photographing apparatus and a depth value thereof is 124, and a depth value of object "2" is 125.

The 3D image data generating unit 140 allocates a pixel value of the pixel, one block left from the pixel, to the pixel having a depth value of 126, and a pixel value of the pixel, one block right from the pixel, to the pixel having a depth value of 124, thereby generating left-view image data 302. Accordingly, the left-view image data 302 is generated in which object "1" in the 2D image data 301 is moved to the next block at the right side and the object "3" in the 2D image data 301 is moved to the next block at the left side.

Similarly, the 3D image data generating unit 140 allocates a pixel value of the pixel, one block right from the pixel, to the pixel having a depth value of 126, and a pixel value of the pixel, one block left from the pixel, to the pixel having a depth value of 124, thereby generating right-view image data 303. Accordingly, the right-view image data 303 is generated in which object "1" in the 2D image data 301 is moved to the next block at the left side and the object "3" in the 2D image data 301 is moved to the next block at the right side.

If the left-view image data 302 and the right-view image data 303 are generated as above, a dummy component may be moved to the image area 320. For example, a depth value of a third pixel 312 in the 2D image data 301 is 126. If a second pixel 311 in the 2D image data 301 is moved to the right by one block and the left-view image data 302 is generated, a dummy component may be included in the image area 320 in the left-view image data 302. Accordingly, pixels included in the dummy area are moved to the image area 320, thus causing a boundary of the dummy area to be unclear and causing cross-talk to occur.

The controller (not illustrated) controls the dummy component to not move to the image area. For example, a pixel value of the second pixel 311 in the 2D image data 301 is not allocated to the third pixel 313 in the left-view image data 302. Rather, a pixel value of the third pixel 312, which is an image component that is closest to the second pixel 311 in the 2D image data 301, is allocated to the third pixel 313 in the left-view image data 302.

The 3D image data generating unit 140 may move a pixel having a depth value of 126 to the right by one block and a pixel having a depth value of 124 to the left by one block, thereby generating left-view image data. In this case, the image component may be moved to the dummy area. If the image component is moved to the dummy area, a boundary of the dummy area is not clear and thus cross-talk may occur. The controller (not illustrated) may control the dummy area in the 3D image data to be located at the same coordinate as the dummy area in the 2D image data so that a boundary of the dummy area is not changed.

Figure 4:
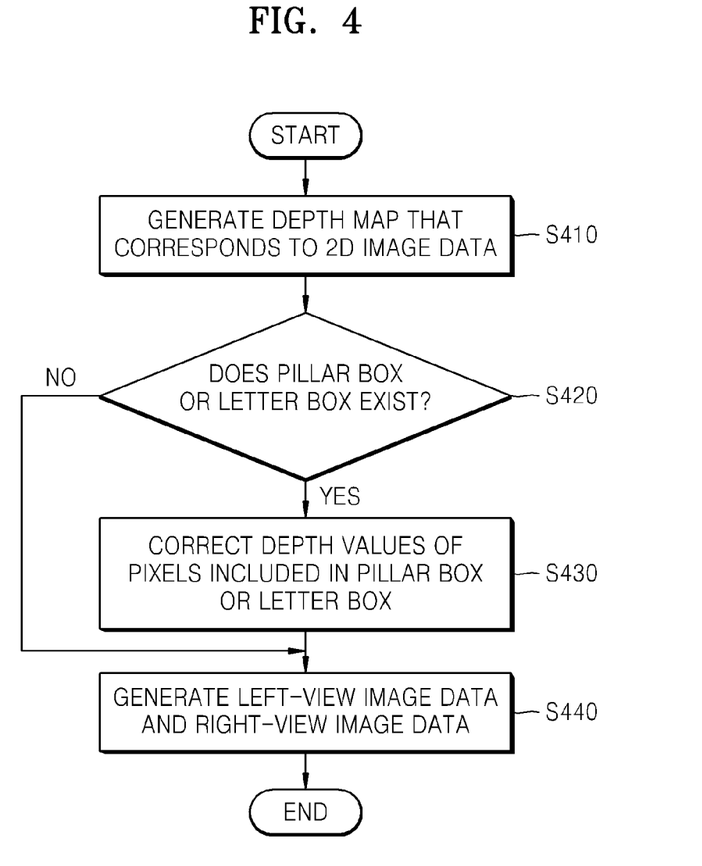
FIG. 4 is a flowchart illustrating a method of generating 3D image data, according to an exemplary embodiment.

FIG. 4 is a flowchart illustrating a method of generating 3D image data, according to an exemplary embodiment. Referring to FIG. 4, in operation S410, a depth map that corresponds to 2D image data is generated.

In operation S420, whether a pillar box or a letter box exists in the 2D image data is determined. If the pillar box or the letter box exists in the 2D image data, operation S430 is performed. In contrast, if the pillar box or the letter box does not exist in the 2D image data, operation S440 is performed without first performing operation S430.

In operation S430, depth values of the pixels included in the pillar box or the letter box are corrected to depth values represented by a screen of a display device. That is, the depth values of the pixels included in the pillar box or the letter box are designated to a depth value where binocular disparity is 0.

In operation S440, left-view image data and right-view image data are generated based on the depth map.

Figure 5:
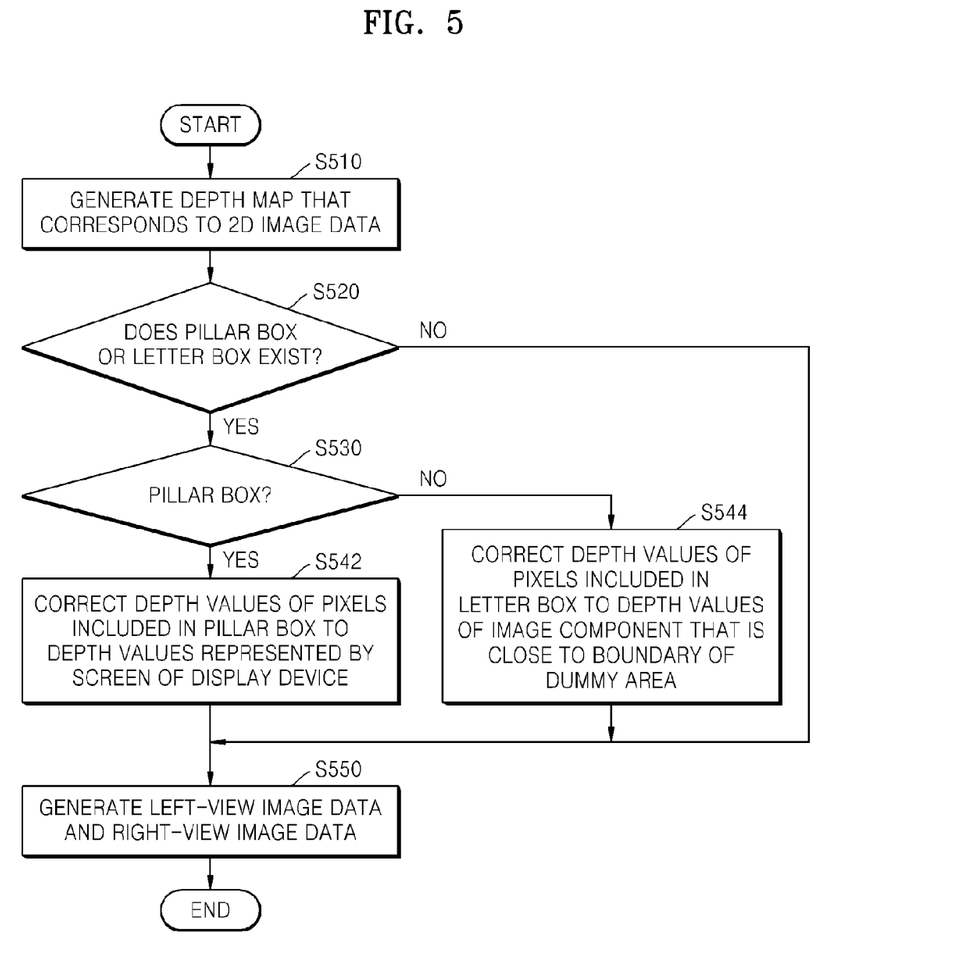
FIG. 5 is a flowchart illustrating a method of generating 3D image data, according to another exemplary embodiment.

FIG. 5 is a flowchart illustrating a method of generating 3D image data, according to another exemplary embodiment. Referring to FIG. 5, in operation S510, a depth map that corresponds to 2D image data is generated.

In operation S520, whether a pillar box or a letter box exists in the 2D image data is determined. If the pillar box or the letter box exists in the 2D image data, operation S530 is performed. Conversely, if the pillar box or the letter box does not exist in the 2D image data, operation S550 is performed without first performing operations S530, S542, and S544.

In operation S530, whether a pillar box exists in the 2D image data is determined. If the pillar box exists in the 2D image data, operation S542 is performed. In contrast, if the pillar box does not exist in the 2D image data, operation S544 is performed.

In operation S542, depth values of the pixels included in the pillar box are corrected to depth values represented by a screen of a display device. That is, the depth values of the pixels included in the pillar box or the letter box are designated to a depth value where binocular disparity is 0.

In operation S544, depth values of the pixels included in the letter box are corrected to depth values of an image component that is close to a boundary of a dummy area.

In operation S550, left-view image data and right-view image data are generated based on the depth map.

Figure 6:
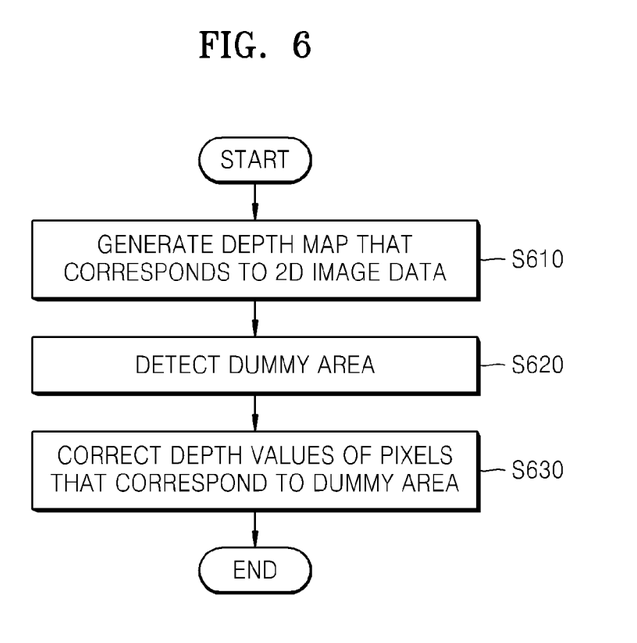
FIG. 6 is a flowchart illustrating a method of generating 3D image data, according to another exemplary embodiment.

FIG. 6 is a flowchart illustrating a method of generating 3D image data, according to another exemplary embodiment. Referring to FIG. 6, in operation S610, a depth map that corresponds to 2D image data is generated.

In operation S620, a dummy area including a dummy component is detected from the 2D image data.

In operation S630, depth values of pixels that correspond to the dummy area in the depth map are corrected.

While the aforementioned exemplary embodiments are described with reference to apparatuses or methods in which a depth map is generated, it is understood that another exemplary embodiment is not limited thereto. For example, in another exemplary embodiment, the depth map may be received from an external source (for example, in a broadcast signal, a digital multimedia transmission, or an optical storage medium such as a Blu-ray disc).

Furthermore, while not restricted thereto, exemplary embodiments can also be embodied as computer-readable code on a computer-readable recording medium. The computer-readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, etc. Also, exemplary embodiments may be written as computer programs transmitted over a computer-readable transmission medium, such as a carrier wave, and received and implemented in general-use or special-purpose digital computers that execute the programs. Moreover, while not required in all aspects, one or more units of the apparatus for generating 3D image data can include a processor or microprocessor executing a computer program stored in a computer-readable medium.

While has aspects have been particularly shown and described with reference to exemplary embodiments, it will be understood by those of ordinary skill in the art that various changes in form and details may be made therein without departing from the spirit and scope of the present invention as defined by the following claims.

What is claimed is:

1. A method of generating three-dimensional (3D) image data by using two-dimensional (2D) image data comprising a dummy component and an image component relating to an input image, wherein the dummy component is used to adjust a resolution of the input image, the method comprising:
   generating a depth map that corresponds to the 2D image data;
   detecting, in the 2D image data, a dummy area comprising the dummy component; and correcting depth values of pixels that correspond to the dummy area in the depth map, the pixels that correspond to the dummy area each having a same pixel value.

2. The method of claim 1, further comprising generating the 3D image data by moving locations of pixels in the 2D image data based on the corrected depth map.

3. The method of claim 2, wherein the generating the 3D image data comprises controlling the dummy component to not be located in an image area including the image component in the 3D image data.

4. The method of claim 2, wherein the generating the 3D image data comprises controlling a dummy area in the 3D image data to be located at a same coordinate area as the dummy area of the 2D image data.

5. The method of claim 1, wherein the correcting the depth values comprises correcting the depth values of the pixels in the dummy area to be equal.

6. The method of claim 1, wherein the correcting the depth values comprises correcting the depth values of the pixels in the dummy area to be equal to a value representing a screen of a display device.

7. The method of claim 1, wherein the correcting the depth values comprises correcting the depth values of the pixels in the dummy area to be equal to a value representing an image component that is closest to a boundary of the dummy area.

8. The method of claim 1, wherein the detecting the dummy area comprises receiving location information about the dummy area and detecting the dummy area according to the received location information.

9. The method of claim 1, wherein the dummy component comprises at least one of a pillar box and a letter box.

10. The method of claim 1, further comprising:
expanding or reducing the input image; and
generating the 2D image data by adding the dummy component to the expanded or reduced input image.

11. The method of claim 10, wherein the expanding or reducing the input image comprises expanding or reducing the input image while maintaining a constant aspect ratio of the input image.

12. The method of claim 1, wherein the correcting the depth values comprises:
correcting the depth values of the pixels in the dummy area to be equal to a value representing a screen of a display device in response to the detected dummy area being a pillar box; and
correcting the depth values of the pixels in the dummy area to be equal to a value representing an image component that is closest to a boundary of the dummy area in response to the detected dummy area being a letter box.

13. The method of claim 1, wherein the correcting the depth values comprises:
correcting the depth values of the pixels in the dummy area to be equal to a value representing a screen of a display device in response to the detected dummy area being a letter box; and
correcting the depth values of the pixels in the dummy area to be equal to a value representing an image component that is closest to a boundary of the dummy area in response to the detected dummy area being a pillar box.

14. An apparatus for generating three-dimensional (3D) image data by using two-dimensional (2D) image data comprising a dummy component and an image component relating to an input image, wherein the dummy component is used to adjust a resolution of the input image, the apparatus comprising:
a depth map generator comprising a processor which generates a depth map that corresponds to the 2D image data;
a detector which detects, in the 2D image data, a dummy area comprising the dummy component; and
a corrector which corrects depth values of pixels that correspond to the dummy area in the depth map, the pixels that correspond to the dummy area each having a same pixel value.

15. The apparatus of claim 14, further comprising a 3D image data generator which generates the 3D image data by moving locations of pixels in the 2D image data based on the corrected depth map.

16. The apparatus of claim 15, wherein the 3D image data generator comprises a controller which controls the dummy component to not be located in an image area including the image component in the 3D image data.

17. The apparatus of claim 15, wherein the 3D image data generator comprises a controller which controls a dummy area in the 3D image data to be located at a same coordinate area as the dummy area of the 2D image data.

18. The apparatus of claim 14, wherein the corrector corrects the depth values of the pixels in the dummy area to be equal.

19. The apparatus of claim 14, wherein the corrector corrects the depth values of the pixels in the dummy area to be equal to a value representing a screen of a display device.

20. The apparatus of claim 14, wherein the corrector corrects the depth values of the pixels in the dummy area to be equal to a value representing an image component that is closest to a boundary of the dummy area.

21. The apparatus of claim 14, wherein:
the detector comprises a receiving unit which receives location information about the dummy area; and
the detector detects the dummy area using the location information.

22. The apparatus of claim 14, wherein the dummy component comprises at least one of a pillar box and a letter box.

23. The apparatus of claim 14, further comprising a 2D image data generator which expands or reduces the input image and which generates the 2D image data by adding the dummy component to the expanded or reduced input image.

24. A non-transitory computer readable recording medium having embodied thereon a computer program for executing a method of generating three-dimensional (3D) image data by using two-dimensional 2D image data comprising a dummy component and an image component relating to an input image, wherein the dummy component is used to adjust a resolution of the input image, the method comprising:
generating a depth map that corresponds to the 2D image data;
detecting, in the 2D image data, a dummy area comprising the dummy component; and
correcting depth values of pixels that correspond to the dummy area in the depth map, the pixels that correspond to the dummy area each having a same pixel value.

* * * * *